March 15, 1966 M. B. PACKER 3,240,309
CLUTCH FRICTION ELEMENT
Filed June 14, 1963
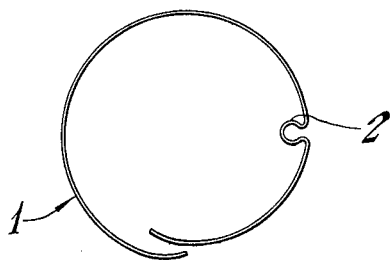
Fig.1.  Fig.2.
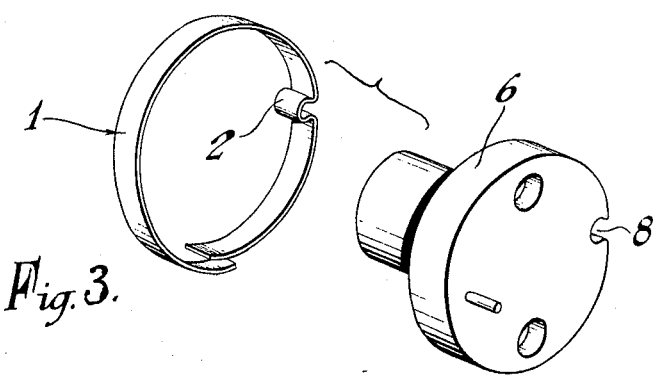
Fig.3.
INVENTOR
Mervyn B. Packer
BY Lawrence J. Winter
ATTORNEY

# United States Patent Office 3,240,309
Patented Mar. 15, 1966

3,240,309
CLUTCH FRICTION ELEMENT
Mervyn B. Packer, Leamington Spa, England, assignor to Automotive Products Company Limited, Warwickshire, England
Filed June 14, 1963, Ser. No. 287,899
Claims priority, application Great Britain, June 15, 1962, 23,191/62
1 Claim. (Cl. 192—107)

The invention has for its object to provide an improved construction of clutch primarily for use in a deceleration responsive device of the inertia type, which will develop the required torque in the low torque direction of clutch operation. This is attained by utilising as the clutch member a spirally wound spring having the convolutions lying in a common plane, the spring being adapted to be anchored at a point in the length of the spring convolutions, such that a short length of spring is provided extending less distance from one side of the anchor point than the other side of the anchor point. The short length of spring has the effect of a "leading shoe" which increases the torque in the low torque direction of operation of the clutch and also enables the spring to be used at a smaller radius.

An embodiment of the inventon will now be described by way of example with the aid of the accompanying drawings in which:

FIGURE 1 is a view of a clutch member in elevation.

FIGURE 2 is a view as seen from the right of FIGURE 1.

FIGURE 3 is an exploded perspective view of the clutch and a mating part of the device.

Referring to the drawings, particularly FIGURES 1 and 2, the spring forming the clutch and indicated generally by reference numeral 1 is wound from strip spring steel, to produce a flat spiral, a spring anchorage 2 being provided by reverse bending the strip to produce a radially inward extending projecting spaced a short distance from the inner end of the spiral. In use the spring is disposed in an annular space between co-axially arranged surfaces of the driving and driven members of the clutch, the inner surface being provided with a recess to receive the projection anchoring the spring.

A clutch of the kind according to the present invention can be used for example in the deceleration-responsive device of the inertia type disclosed in the specification of our British Patent Number 935,830.

The radial projection 2 of the spring engages in a recess 8 in the peripheral surface of the mating driven member 6 around which the spring clutch is disposed. The flywheel 5 operates through the short length of the spring adjacent one side of the anchor point 2 to produce a low torque sufficient to cause the ball members to snap out of their recesses in the cam mechanism 9 in order to force the other portion of the cam mechanism in an axial direction to displace the thrust rod 10. The short length of the clutch spring provides only a low torque but sufficient to cause the above-described operation. It will also be noted that the short length of the spring clutch is disposed so as to produce a torque when the clutch is moved in a direction opposite to the torque produced by the normal operating condition of the clutch. It will also be noted that the short length of the spring has its free end disposed radially inwardly of the free end of the longer length of the spring so as not to interfere with the operation of the spring clutch when the clutch is in a normal operating condition. The short length of the spring clutch is not sufficient to produce enough torque after operation of the cam mechanism so that the spring clutch will permit the flywheel to rotate freely after the cam mechanism 9 is operated. With the spring clutch construction of the invention the short length of spring extending between the anchor point and the inner end of the spring ensures that sufficient torque is available in the low torque direction of operation of the clutch to overcome the static loads in the cam mechanism.

I claim:

A clutch comprising a spirally wound steel strip spring lying in a common plane, a reverse bend disposed in said spring forming a radially inwardly extending loop projection of semi-circular configuration, said spring having a long circular convolution and a short circular convolution extending in opposite directions from said loop projection, with said long and short convolutions having their ends disposed away from said loop projection being free ends, and said free end of said short convolution being disposed in a circumferential direction radially inwardly of the adjacent circumferential overlapping portion of said longer convolution, and said shorter convolution being adapted to contact the inner surface of said longer convolution adjacent said free end of said longer convolution.

References Cited by the Examiner
UNITED STATES PATENTS

| | | |
|---|---|---|
| 1,470,074 | 10/1923 | Gomez. |
| 1,690,267 | 11/1928 | Barrows et al. _____ 192—41 X |
| 1,761,485 | 6/1930 | McNeil _____ 192—41 X |
| 2,136,312 | 11/1938 | Page _____ 192—41 X |
| 2,360,157 | 10/1944 | Olson _____ 64—30 X |
| 2,479,965 | 8/1949 | Ragsdale _____ 192—41 |

FOREIGN PATENTS 514,314  2/1955  Italy.

DAVID J. WILLIAMOWSKY, *Primary Examiner.*

B. W. WYCHE, *Assistant Examiner.*